(12) United States Patent
Suzuki

(10) Patent No.: US 10,268,137 B2
(45) Date of Patent: Apr. 23, 2019

(54) OPTICAL SCANNING DEVICE AND IMAGE FORMING APPARATUS

(71) Applicant: FUJI XEROX CO., LTD., Tokyo (JP)

(72) Inventor: Yoshiyuki Suzuki, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 15/493,516

(22) Filed: Apr. 21, 2017

(65) Prior Publication Data

US 2018/0081295 A1 Mar. 22, 2018

(30) Foreign Application Priority Data

Sep. 21, 2016 (JP) ................................. 2016-184025

(51) Int. Cl.
| | | |
|---|---|---|
| *G03G 15/043* | (2006.01) | |
| *G02B 26/08* | (2006.01) | |
| *G02B 26/10* | (2006.01) | |
| *H04N 1/028* | (2006.01) | |
| *H04N 1/03* | (2006.01) | |
| *H04N 1/10* | (2006.01) | |
| *G02B 26/12* | (2006.01) | |

(52) U.S. Cl.
CPC ....... *G03G 15/043* (2013.01); *G02B 26/0875* (2013.01); *G02B 26/10* (2013.01); *G02B 26/123* (2013.01); *G03G 15/0435* (2013.01); *H04N 1/0283* (2013.01); *H04N 1/0306* (2013.01); *H04N 1/1048* (2013.01); *H04N 2201/0091* (2013.01); *H04N 2201/02422* (2013.01); *H04N 2201/02431* (2013.01)

(58) Field of Classification Search
CPC ............ G03G 15/04; G03G 15/04036; G03G 15/0409; G03G 15/043; B41J 2/442; B41J 2/447; B41J 2/451
USPC .......... 399/51, 118, 205, 218; 347/134, 137, 347/239, 241, 244, 256, 258
See application file for complete search history.

(56) References Cited

U.S. PATENT DOCUMENTS

| | | |
|---|---|---|
| 2011/0169906 A1 | 7/2011 | Suzuki |
| 2012/0176462 A1 | 7/2012 | Suzuki |

FOREIGN PATENT DOCUMENTS

| | | |
|---|---|---|
| JP | 2011-143565 A | 7/2011 |
| JP | 2012-141544 A | 7/2012 |
| JP | 2013-68802 A | 4/2013 |

*Primary Examiner* — Benjamin R Schmitt
(74) *Attorney, Agent, or Firm* — Sughrue Mion, PLLC

(57) ABSTRACT

An optical scanning device includes a light source having plural light emitting portions, a deflection unit that deflects and scans plural light beams emitted from the light source in a main scanning direction, and plural optical element groups disposed between the light source and the deflection unit and including an optical element having a negative refractive power along a sub-scanning direction intersecting the main scanning direction. An interval in the sub-scanning direction of the plural light beams is adjusted by tilting the optical element having the negative refractive power on an axis along the main scanning direction.

9 Claims, 18 Drawing Sheets

OPTICAL SCANNING DEVICE AND IMAGE FORMING APPARATUS

CROSS-REFERENCE TO RELATED APPLICATIONS

This application is based on and claims priority under 35 USC 119 from Japanese Patent Application No. 2016-184025 filed Sep. 21, 2016.

BACKGROUND

(i) Technical Field

The present invention relates to an optical scanning device and an image forming apparatus.

(ii) Related Art

In a known optical scanning device, after light beams emitted from a light source are converted into parallel light by a cylindrical lens, the light beams are deflectively scanned by a rotary polygonal mirror along the main scanning direction serving as the axial direction of a photoconductor drum, and are focused on the photoconductor drum by a lens such as an fθ lens that focuses light incident from different angles on different distances.

Such an optical scanning device sometimes uses a light source in which plural light emitting portions are two-dimensionally arranged to increase the resolution and speed. In this optical scanning device, if the interval in the sub-scanning direction of plural light beams emitted from the plural light emitting portions and focused on the photoconductor drum deviates from a required value, an image defect called banding, for example, periodic streaks or density unevenness occurs in a periodic image such as a horizontal line image or a halftone image.

SUMMARY

According to an aspect of the invention, there is provided an optical scanning device including a light source having plural light emitting portions, a deflection unit that deflects and scans plural light beams emitted from the light source in a main scanning direction, and plural optical element groups disposed between the light source and the deflection unit and including an optical element having a negative refractive power along a sub-scanning direction intersecting the main scanning direction, wherein an interval in the sub-scanning direction of the plural light beams is adjusted by tilting the optical element having the negative refractive power on an axis along the main scanning direction.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Exemplary Embodiment

Figure 1:
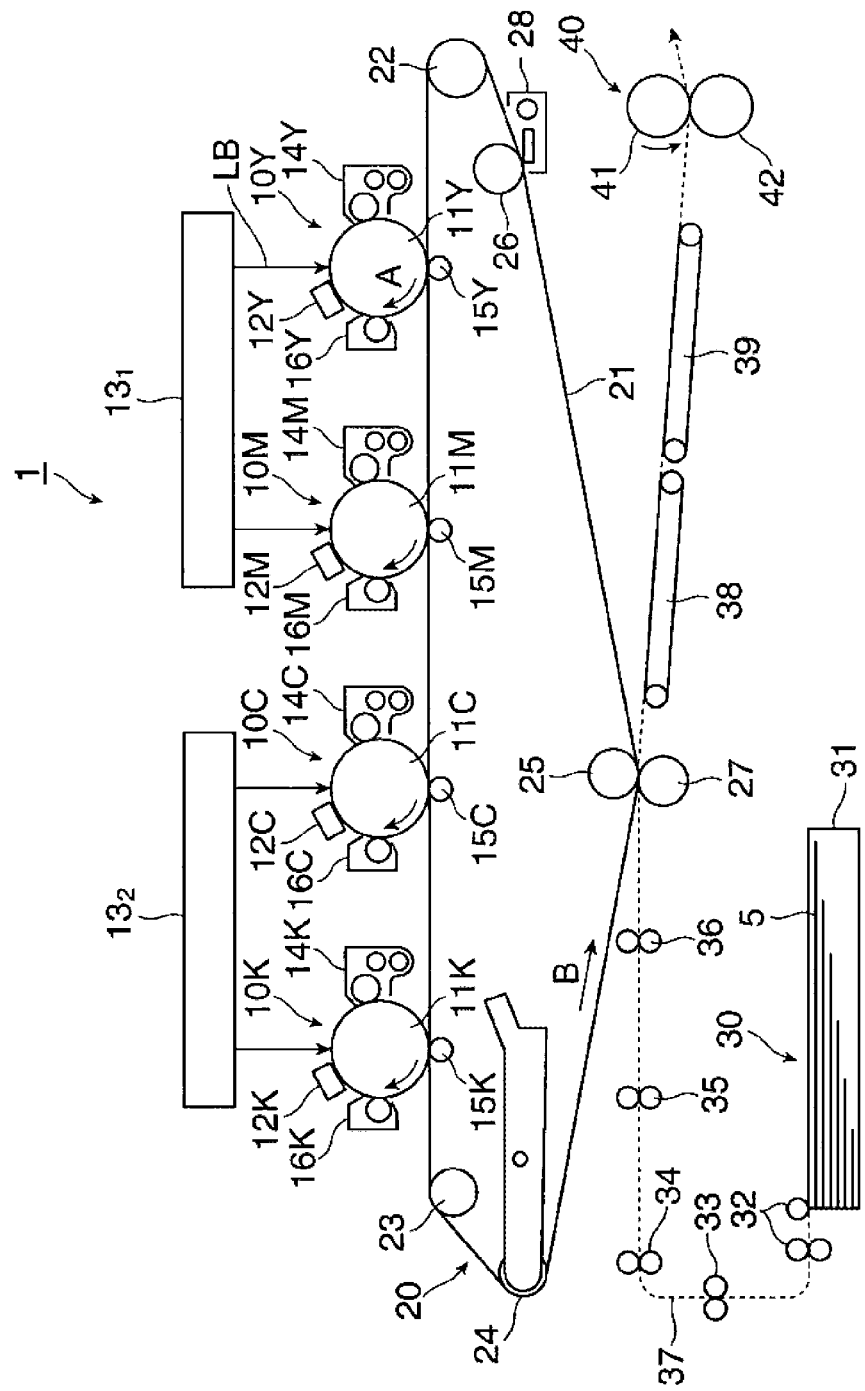
FIG. 1 is a schematic structural view of an image forming apparatus to which an optical scanning device according to a first exemplary embodiment of the present invention is applied.

FIG. 1 illustrates an image forming apparatus to which an optical scanning device according to a first exemplary embodiment is applied.

[Overall Configuration of Image Forming Apparatus]

An image forming apparatus 1 according to the first exemplary embodiment is configurated as, for example, a color printer. The image forming apparatus 1 includes plural image forming devices 10, an intermediate transfer device 20, a paper feeding device 30, and a fixing device 40. The image forming devices 10 each serve as an example of an image forming section that forms a toner image developed with toner contained in developer. The intermediate transfer device 20 holds toner images formed by the image forming devices 10 and transports the toner images to a second transfer position where the toner images are finally second-transferred onto recording paper 5 serving as an example of a recording medium. The paper feeding device 30 stores and transports required recording paper 5 to be supplied to the second transfer position in the intermediate transfer device 20. The fixing device 40 fixes toner images second-transferred on recording paper 5 in the intermediate transfer device 20. In FIG. 1, a broken line shows a transport path along which the recording paper 5 is transported inside the image forming apparatus 1.

The image forming devices 10 include four image forming devices 10Y, 10M, 10C, and 10K that respectively form toner images of four colors of yellow (Y), magenta (M), cyan (C), and black (K). These four image forming devices 10 (Y, M, C, and K) are arranged in line in the horizontal direction.

As illustrated in FIG. 1, each of the image forming devices 10 (Y, M, C, and K) of yellow (Y), magenta (M), cyan (C), and black (K) includes a rotatable photoconductor drum 11 as an example of an image carrier. Around the photoconductor drum 11, the following devices are principally arranged as an example of a toner-image forming unit. The principal devices include a charging device 12, an optical scanning device (exposure device) 13 according to the first exemplary embodiment, a developing device 14 (Y, M, C, or K), a first transfer device 15 (Y, M, C, or K), and a drum cleaning device 16 (Y, M, C, or K). The charging device 12 charges a peripheral surface (image carrying surface) of the photoconductor drum 11, on which an image is formed, to a required potential. The optical scanning device 13 serves as an example of an electrostatic-latent-image forming unit that forms an electrostatic latent image with a potential difference (for the corresponding color) by irradiating the charged peripheral surface of the photoconductor drum 11 with light based on image information (signals). The developing device 14 serves as an example of a developing unit that develops the electrostatic latent image with toner of a developer of the corresponding color (Y, M, C, or K) to form a toner image. The first transfer device 15 serves as an example of a first transfer unit that transfers the toner image onto the intermediate transfer device 20. The drum cleaning device 16 cleans the image carrying surface of the photoconductor drum 11 by removing attached matter, such as toner, remaining on and attached to the image carrying surface after first transfer. The optical scanning device 13 includes a first optical scanning device $13_1$ corresponding to both the yellow (Y) and magenta (M) image forming devices 10 (Y and M), and a second optical scanning device $13_2$ corresponding to both the cyan (C) and black (K) image forming devices 10 (C and K).

The photoconductor drum 11 is obtained by forming an image carrying surface having a photoconductive layer (photosensitive layer) made of a photosensitive material on a peripheral surface of a cylindrical or columnar base material subjected to grounding. The photoconductor drum 11 is supported to be rotated in a direction of arrow A by power transmitted from an unillustrated driving device.

The charging device 12 is constituted by a non-contact charging device, such as a scorotron charging device, disposed out of contact with the surface of the photoconductor drum 11. A charging voltage is supplied to the charging device 12. When the developing device 14 performs reversal development, a voltage or current with the same polarity as the charging polarity of toner supplied from the developing device 14 is supplied as the charging voltage. As the charging device 12, a contact-type charging device, such as a contact-type charging roller, disposed in contact with the photoconductor drum 11 may be used.

The first and second optical scanning devices $13_1$ and $13_2$ each form an electrostatic latent image by irradiating the charged peripheral surface of the photoconductor drum 11 with light LB based on image information input to the image forming apparatus 1. When a latent image is formed, information (signals) of an image input to the image forming apparatus 1 through an arbitrary device and subjected to image processing in an image processing unit is transmitted to the first and second optical scanning devices $13_1$ and $13_2$. The first and second optical scanning devices $13_1$ and $13_2$ will be described in detail later.

In each developing device 14 (Y, M, C, or K), a developing roller, two agitating and transporting members such as screw augers, and a layer-thickness regulating member are arranged inside a housing having an opening and a storage chamber for developer. The developing roller holds the developer and transports the developer to a developing area opposed to the photoconductor drum 11. The agitating and transporting members agitate and transport the developer so that the developer passes by the developing roller. The layer-thickness regulating member regulates the amount (layer thickness) of the developer held on the developing roller. A developing bias voltage is supplied from an unillustrated power supply device between the developing roller of the developing device 14 and the photoconductor drum 11. As developers of four colors (Y, M, C, and K), a two-component developer containing a nonmagnetic toner and magnetic carriers is used.

The first transfer device 15 (Y, M, C, or K) is a contact-type transfer device including a first transfer roller which rotates in contact with the periphery of the photoconductor drum 11 with an intermediate transfer belt 21 interposed therebetween and to which a first-transfer voltage is supplied. As the first-transfer voltage, a DC voltage having a polarity opposite from the toner charging polarity is supplied from the unillustrated power supply device.

The drum cleaning device 16 includes a partly opening container-shaped body, a cleaning blade, and a sending member such as a screw auger. The cleaning blade is disposed in contact with the peripheral surface of the photoconductor drum 11 with a required pressure after first transfer and cleans the peripheral surface by removing attached matter such as residual toner. The sending member collects the attached matter, such as toner, removed by the cleaning blade, and transports and sends out the attached matter to an unillustrated collection system.

As illustrated in FIG. 1, the intermediate transfer device 20 is disposed below the image forming devices 10 (Y, M, C, and K). The intermediate transfer device 20 principally includes an intermediate transfer belt 21, plural belt support rollers 22 to 26, a second transfer device 27, and a belt cleaning device 28. The intermediate transfer belt 21 rotates in a direction of arrow B while passing through first transfer positions between photoconductor drums 11 and first transfer devices 15 (first transfer rollers). The belt support rollers 22 to 26 hold the intermediate transfer belt 21 from the inner side of the intermediate transfer belt 21 in a desired state and support the intermediate transfer belt 21 rotatably. The second transfer device 27 serves as an example of a second transfer unit disposed on an outer peripheral surface (image carrying surface) side of the intermediate transfer belt 21 supported by the belt support roller 25 to second-transfer toner images on the intermediate transfer belt 21 onto recording paper 5. The belt cleaning device 28 removes and cleans off attached matter, such as toner and paper dust, remaining on and attached to the outer peripheral surface of the intermediate transfer belt 21 after the intermediate transfer belt 21 passes by the second transfer device 27.

For example, the intermediate transfer belt 21 is formed as an endless belt made of a material in which a resistance adjusting agent, such as carbon black, is dispersed in synthetic resin such as polyimide resin or polyamide resin. The belt support roller 22 serves as a driving roller to be rotated by the unillustrated driving device, the belt support roller 23 serves as a surface forming roller that forms an image forming surface of the intermediate transfer belt 21, the belt support roller 24 serves as a tensioning roller that applies tension to the intermediate transfer belt 21, the belt support roller 25 serves as a backup roller for second transfer, and the belt support roller 26 serves as a support roller for the belt cleaning device 28.

The second transfer device 27 is a contact-type transfer device including a second transfer roller that rotates in contact with the outer peripheral surface of the intermediate transfer belt 21 supported by the belt support roller 25 in the intermediate transfer device 20 and receives a second transfer voltage at a second transfer position in a portion of the outer peripheral surface of the intermediate transfer belt 21. To the second transfer device 27 or the belt support roller 25 of the intermediate transfer device 20, a DC voltage having a polarity opposite from or identical to the toner charging polarity is supplied as a second transfer voltage from the unillustrated power supply device.

The belt cleaning device 28 includes a container-shaped body having an opening, a cleaning blade, and a sending member such as a screw auger. The cleaning blade is disposed in contact with the peripheral surface of the intermediate transfer belt 21 after second transfer with a required pressure to remove and clean off attached matter such as residual toner. The sending member collects the attached matter, such as toner, removed by the cleaning blade and sends out and transports the attached matter to an unillustrated collection system.

In the fixing device 40, a roll-shaped or belt-shaped heating rotating body 41 and a roll-shaped or belt-shaped pressurizing rotating body 42 are disposed inside an unillustrated housing having an introduction port and an output port for the recording paper 5. The heating rotating body 41 rotates in the direction of arrow and is heated by a heater so that the surface temperature thereof is kept at a predetermined temperature. The pressurizing rotating body 42 rotates in contact with the heating rotating body 41 with a predetermined pressure almost along the axial direction of the heating rotating body 41. In this fixing device 40, a contact portion where the heating rotating body 41 and the pressurizing rotating body 42 are in contact with each other serves as a fixing portion where a required fixing treatment (heating and pressurization) is performed.

The paper feeding device 30 is disposed at a position on the lower side of the intermediate transfer device 20 in the vertical direction. The paper feeding device 30 principally includes a single (or plural) sheet container 31 that contains sheets of recording paper 5 of desired sizes and types in a stacked state, and a feeding unit 32 that feeds out the sheets of recording paper 5 one by one from the sheet container 31. For example, the sheet container 31 is mounted to be drawn out along unillustrated guide rails toward a front surface of the image forming apparatus 1 (a side surface the user faces).

Examples of recording paper 5 include plain paper for use in an electrophotographic copying machine or printer, thin paper such as tracing paper, and an OHP sheet. To further enhance the smoothness of an image surface after fixing, the surface of the recording paper 5 is preferably as smooth as possible. For example, coated paper obtained by coating a surface of plain paper with resin and so-called thick paper having a relatively large basis weight, such as art paper for printing, may be suitably used.

As illustrated in FIG. 1, a paper transport path 37 is provided between the paper feeding device 30 and the second transfer device 27. The paper transport path 37 is composed of single or plural paper transport roller pairs 33 to 36 that transport recording paper 5 fed out from the paper feeding device 30 to the second transfer position, and unillustrated transport guides. In the paper transport path 37, the paper transport roller pair 36 disposed at a position immediately before the second transfer position is provided as a roller for adjusting the transport time of the recording paper 5 (registration roller). Between the second transfer device 27 and the fixing device 40, two transport belts 38 and 39 are provided to transport the recording paper 5 sent from the second transfer device 27 after second transfer to the fixing device 40. Further, in a portion of the image forming apparatus 1 near a paper output port, a paper output roller pair (not illustrated) is provided to output the fixed recording paper 5 sent out from the fixing device 40 to an unillustrated paper output unit provided on a side surface of the image forming apparatus 1.

[Operation of Image Forming Apparatus]

The basic image forming operation of the image forming apparatus 1 will be described below.

A description will now be given of the operation in a full-color mode in which a full-color image is formed by combining toner images of four colors (Y, M, C, and K) by using the above-described four image forming devices 10 (Y, M, C, and K).

When the image forming apparatus 1 receives command information requesting a full-color image forming operation (printing) from, for example, a user interface or a printer driver (not illustrated), the four image forming devices 10 (Y, M, C, and K), the intermediate transfer device 20, the second transfer device 27, and the fixing device 40 start.

In the image forming devices 10 (Y, M, C, and K), as illustrated in FIG. 1, the photoconductor drums 11 first rotate in the direction of arrow A, and the charging devices 12 charge the surfaces of the photoconductor drums 11 to a required polarity (negative polarity in the first exemplary embodiment) and a required potential. Next, the first and second optical scanning devices $13_1$ and $13_2$ irradiate the charged surfaces of the photoconductor drums 11 with light LB emitted on the basis of image signals obtained by converting image information input to the image forming apparatus 1 into color components (Y, M, C, and K) so as to form electrostatic latent images of the color components with required potential differences on the surfaces.

Next, the image forming devices 10 (Y, M, C, and K) develop the electrostatic latent images of the color components formed on the photoconductor drum 11 by supplying toners of the corresponding colors (Y, M, C, and K) charged with the required polarity (negative polarity) from the developing rollers and electrostatically attaching the toners to the electrostatic latent images. By this development, the electrostatic latent images of the color components formed on the photoconductor drums 11 are visualized as toner images of four colors (Y, M, C, and K) developed with the corresponding color toners.

Next, when the color toner images formed on the photoconductor drums 11 in the image forming devices 10 (Y, M, C, and K) are transported to the first transfer positions, the color toner images are first-transferred by the first transfer devices 15 (Y, M, C, and K) so that the toner images are superimposed in order onto the intermediate transfer belt 21 rotating in the direction of arrow B in the intermediate transfer device 20.

In the image forming devices 10 (Y, M, C, and K) after first transfer is finished, the drum cleaning devices 16 clean the surfaces of the photoconductor drums 11 by scraping off attached matter. This allows the image forming devices 10 (Y, M, C, and K) to be ready for the next image forming operation.

Next, in the intermediate transfer device 20, the intermediate transfer belt 21 rotates to hold and transport the first-transferred toner images to the second transfer position. On the other hand, in the paper feeding device 30, required recording paper 5 is fed out to the paper transport path 37 in timing to the image forming operation. In the paper transport path 37, the paper transport roller pair 36 serving as the registration roller feeds out and supplies the recording paper 5 to the second transfer position in timing to the transfer time.

At the second transfer position, the second transfer device 27 collectively second-transfers the toner images on the intermediate transfer belt 21 onto the recording paper 5. In the intermediate transfer device 20 after the second transfer, the belt cleaning device 28 removes and cleans off attached matter, such as toner, remaining on the surface of the intermediate transfer belt 21 after the second transfer.

Next, the recording paper 5 on which the toner images are second-transferred is stripped from the intermediate transfer belt 21, and is transported to the fixing device 40 via the two transport belts 38 and 39. In the fixing device 40, the recording paper 5 after second transfer is introduced and passed through the contact portion between the rotating heating rotating body 41 and the pressurizing rotating body 42, and is subjected to the necessary fixing treatment (heating and pressurization) to fix the unfixed toner images onto the recording paper 5. Finally, after fixing is finished, the recording paper 5 is output to the paper output unit (not illustrated) provided on the side surface of the image forming apparatus 1 by the unillustrated paper output roller pair in an image forming operation for forming an image on only one surface.

Through the above-described operation, the recording paper 5 on which a full-color image is formed by combining four color toner images is output.

[Structure of Optical Scanning Devices]

Figure 2:
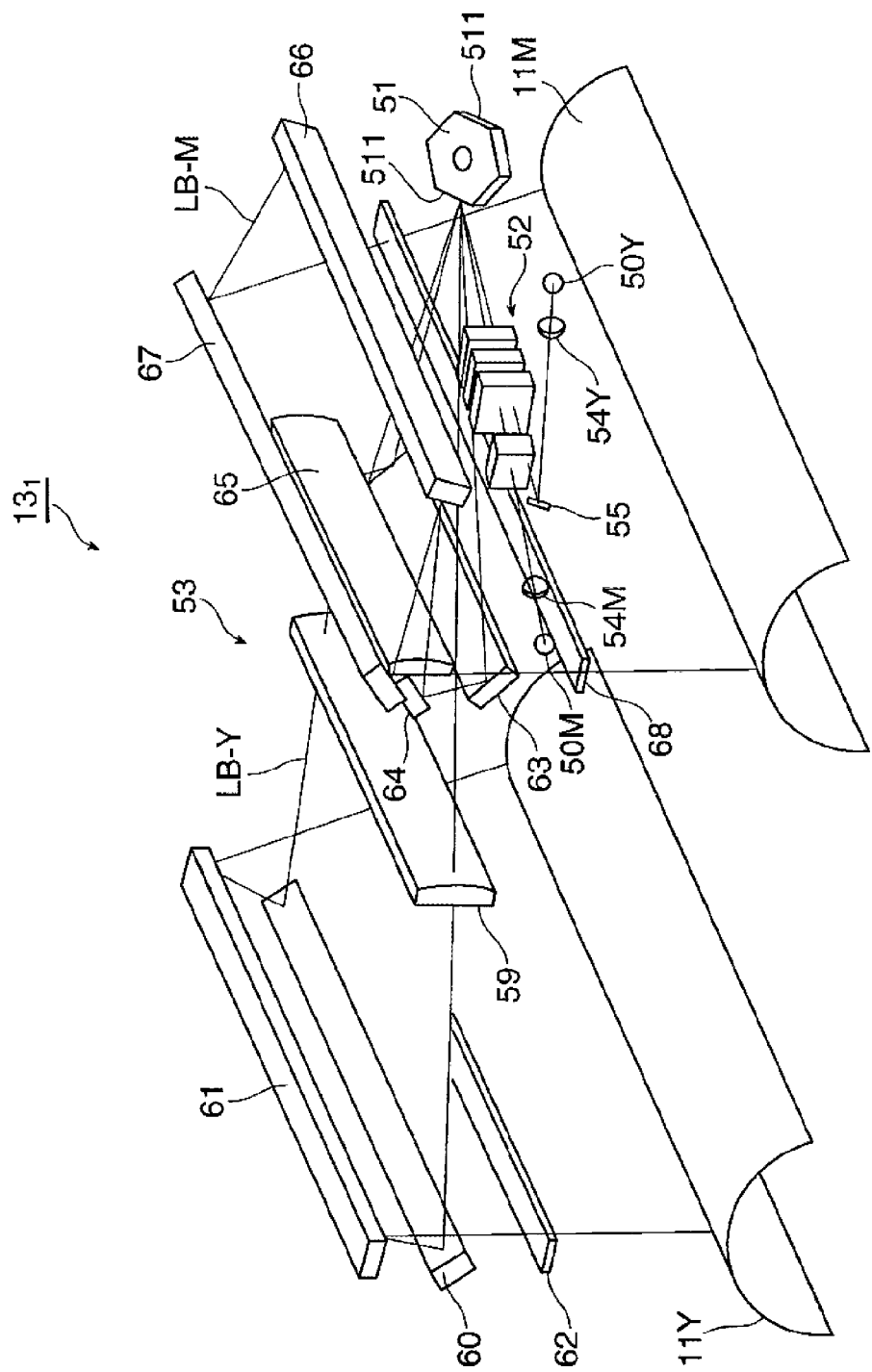
FIG. 2 is a structural perspective view of the optical scanning device according to the first exemplary embodiment.
Figure 3:
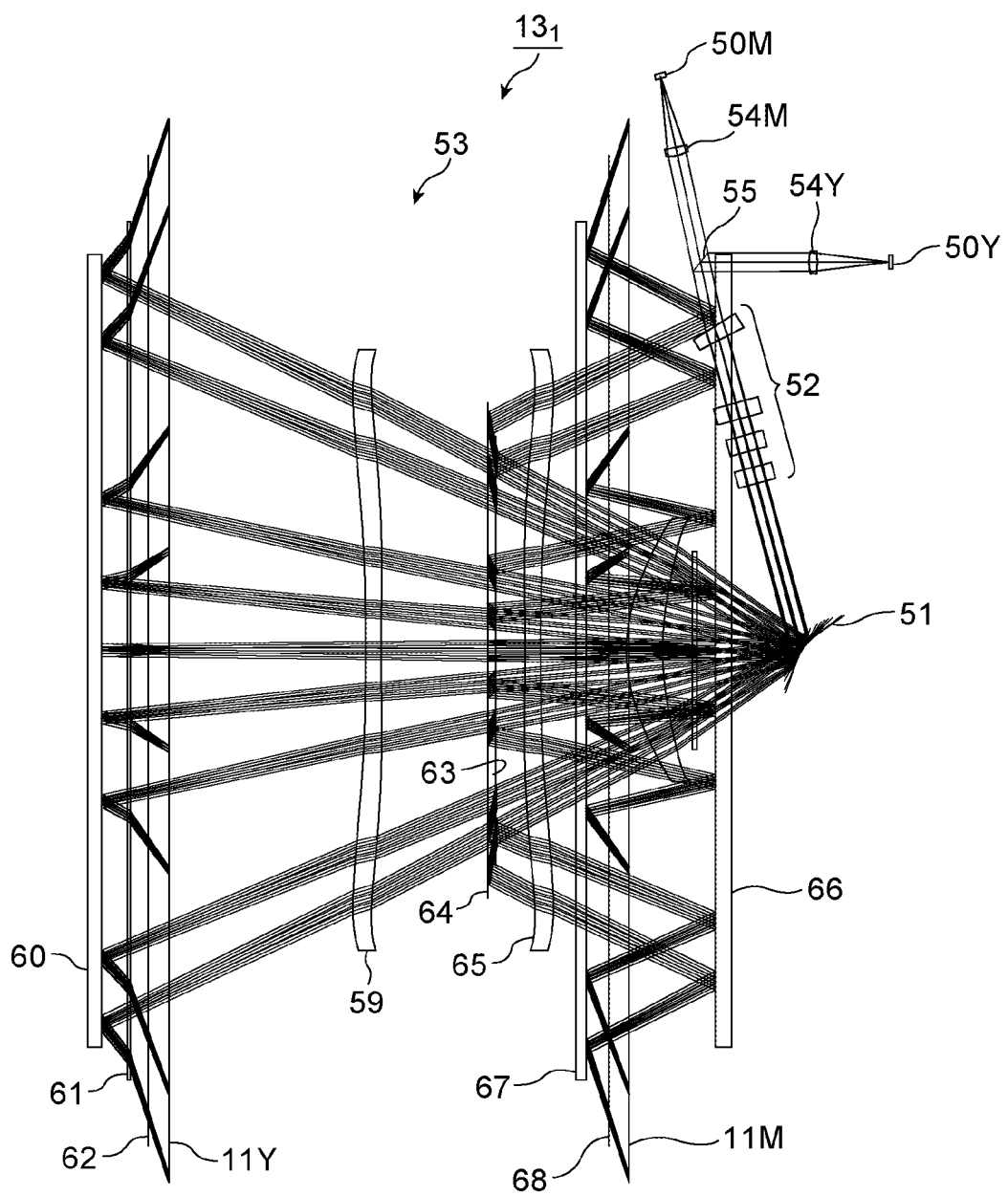
FIG. 3 is a structural plan view of the optical scanning device according to the first exemplary embodiment.

FIGS. 2 and 3 illustrate the optical scanning device according to the first exemplary embodiment. FIG. 2 is a structural perspective view of the optical scanning device, and FIG. 3 is a structural plan view of the optical scanning device. In FIG. 2, the photoconductor drums 11 (Y, M) are illustrated as substantially semicylindrical portions showing parts of the surfaces thereof.

As illustrated in FIG. 1, the image forming apparatus 1 includes the first optical scanning device $13_1$ commonly used for the yellow and magenta image forming devices 10 (Y, M), and the second optical scanning device $13_2$ commonly used for the cyan and black image forming devices 10 (C, K). The first and second optical scanning devices $13_1$ and $13_2$ have a similar structure. Here, the first optical scanning device $13_1$ will be representatively described.

As illustrated in FIGS. 2 and 3, the first optical scanning device $13_1$ roughly includes a light source $50_Y$ for yellow serving as an example of a first light source having plural light emitting portions, a light source $50_M$ for magenta serving as an example of a second light source similarly having plural light emitting portions, a rotary polygonal mirror 51 serving as an example of a deflection unit for deflecting and scanning laser beams LB-Y and LB-M serving as plural light beams respectively emitted from the yellow light source $50_Y$ and the magenta light source $50_M$, a pre-deflection optical system 52 disposed on the front side (light source side) of the rotary polygonal mirror 51 in the optical axis direction, and a post-deflection optical system 53 disposed on the rear side (scanned object side) of the rotary polygonal mirror 51 in the optical axis direction.

Figure 4:
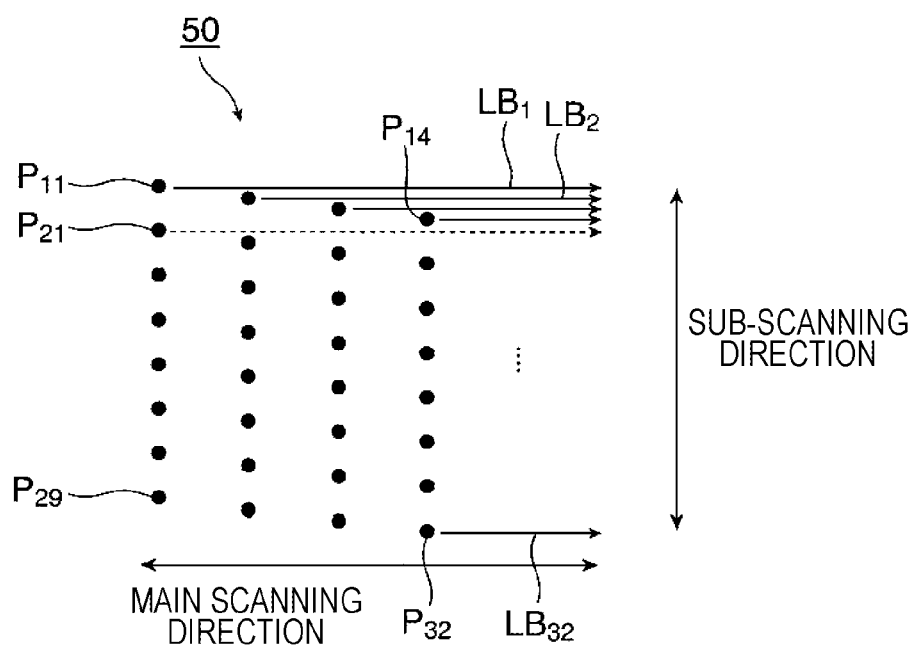
FIG. 4 schematically illustrates a light source.

For example, each of the yellow and magenta light sources $50_Y$ and $50_M$ is a surface-emitting laser beam array constituted by a vertical cavity surface emitting laser (Vcsel) in which plural light emitting portions are two-dimensionally arranged. As illustrated in FIG. 4, each of the yellow and magenta light sources $50_Y$ and $50_M$ is a surface-emitting laser beam array in which a total of 32 light emitting portions $P_1$ to $P_{32}$ are two-dimensionally arranged in an 8 by 4 array to be located at different positions in the main scanning direction and the sub-scanning direction. Each of the light sources $50_Y$ and $50_M$ may include plural units each composed of plural light emitting portions arranged linearly. From each of the light sources $50_Y$ and $50_M$, 32 laser beams $LB_1$ to $LB_{32}$ are emitted as examples of plural light beams. Here, a laser beam emitted from the yellow light source $50_Y$ is represented by LB-Y, and a laser beam emitted from the magenta light source $50_M$ is represented by LB-M. The interval between the laser beams provided on the outermost ends in the sub-scanning direction, of the 32 laser beams LB-$Y_1$ to LB-$Y_{32}$ and 32 laser beams LB-$M_1$ to LB-$M_{32}$ emitted from the yellow and magenta light sources $50_Y$ and $50_M$, is $(25.4/1200) \times 32 =$ about 0.68 mm on the surface of the photoconductor drum 11 serving as an example of a scanned object, for example, when the resolution is 1200 dpi (dot/inch). The resolution of the laser beam LB scanned and applied for exposure to the surface of the photoconductor drum 11 is not limited to 1200 dpi, but may be either higher or lower than 1200 dpi.

Figure 5:
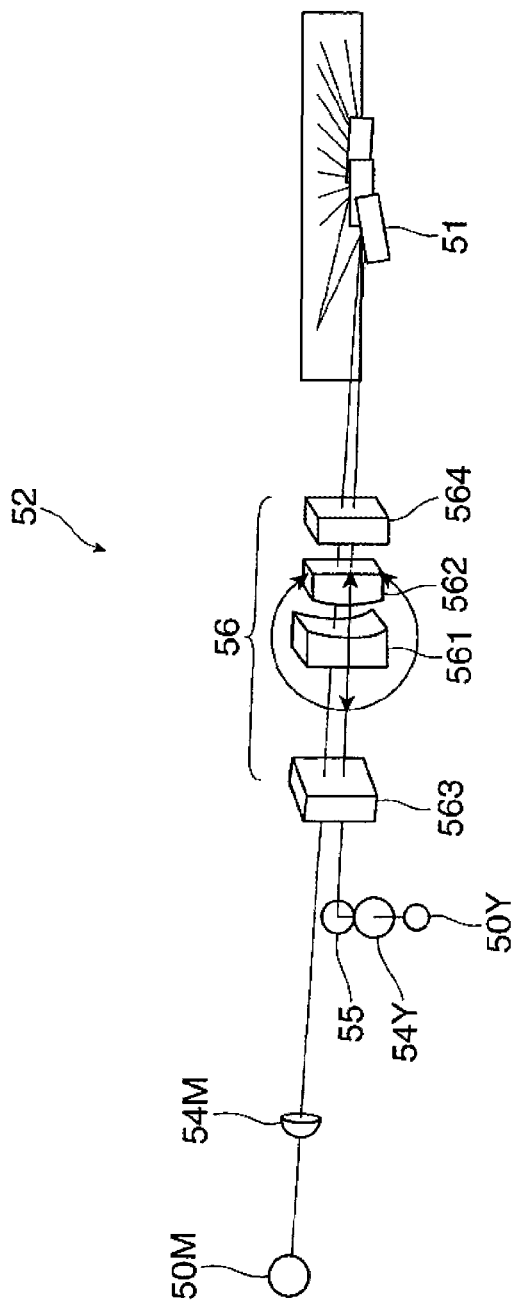
FIG. 5 is a structural perspective view of a pre-deflection optical system.
Figure 6:
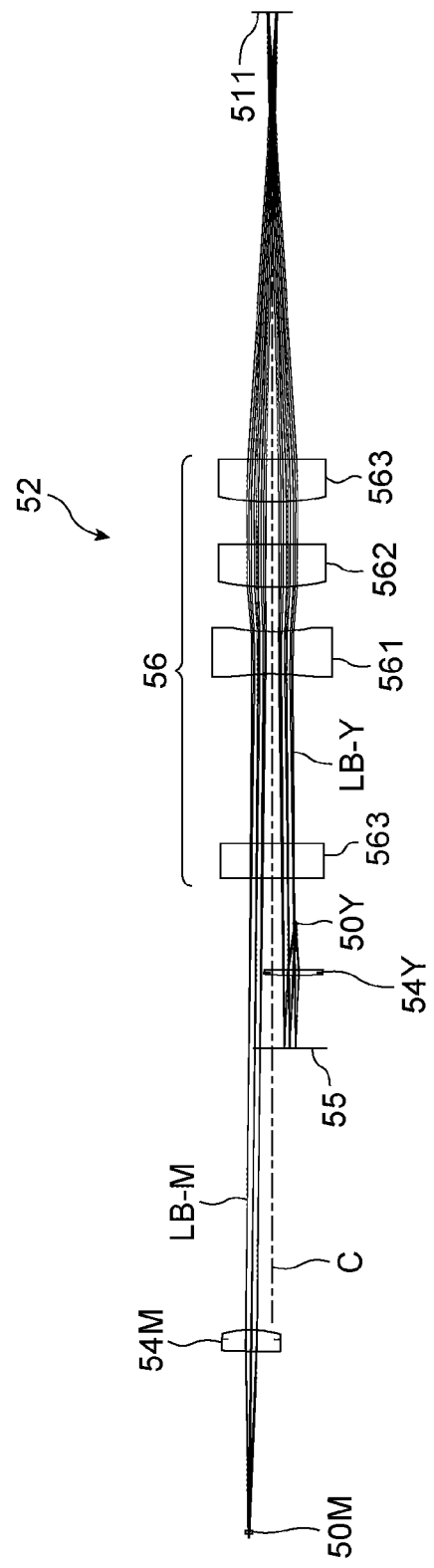
FIG. 6 is a structural side view of the pre-deflection optical system.

As illustrated in FIGS. 5 and 6, the pre-deflection optical system 52 includes a coupling lens $54_Y$ for yellow, a coupling lens $54_M$ for magenta, a reflecting mirror 55, and an optical element group 56 composed of, for example, plural lenses common to yellow and magenta.

The yellow coupling lens $54_Y$ converts plural laser beams LB-$Y_1$ to LB-$Y_{32}$ emitted from the yellow light source $50_Y$ into substantially parallel light. Similarly, the magenta coupling lens $54_M$ converts plural laser beams LB-$M_1$ to LB-$M_{32}$ emitted from the magenta light source $50_M$ into substantially parallel light.

After converted into substantially parallel light by the yellow coupling lens $54_Y$, the plural laser beams LB-$Y_1$ to LB-$Y_{32}$ emitted from the yellow light source $50_Y$ are reflected by the reflecting mirror 55 and enter the optical element group 56. Also, after converted into substantially parallel light by the magenta coupling lens $54_M$, the plural laser beams LB-$M_1$ to LB-$M_{32}$ emitted from the magenta light source $50_M$ directly enter the optical element group 56.

The optical element group 56 includes a cylindrical concave lens 561 serving as an example of a first optical element and composed of at least one concave lens, and a cylindrical convex lens 562 serving as an example of a second optical element and composed of at least one convex lens. The optical element group 56 forms a zoom lens as an interval-adjusting optical system (adjusting unit) for adjusting the interval in the sub-scanning direction of the plural laser beams $LB_1$ to $LB_{32}$. The optical element group 56 forms an interval-adjusting optical system for adjusting the interval in the sub-scanning direction of plural laser beams LB emitted from the single light source. Further, the optical element group 56 forms an interval-adjusting optical system for not only adjusting the interval of the laser beams emitted from the single light source, but also simultaneously adjusting the intervals in the sub-scanning direction of the plural laser beams LB-$Y_1$ to LB-$Y_{32}$ and the plural laser beams LB-$M_1$ to LB-$M_{32}$ emitted from the yellow and magenta light sources $50_Y$ and $50_M$ serving as plural light sources, and adjusting the intervals in the sub-scanning direction of the yellow laser beams LB-$Y_1$ to LB-$Y_{32}$ and the magenta laser beams LB-$Y_1$ to LB-$Y_{32}$ in the same direction or opposite directions.

Figure 7A:
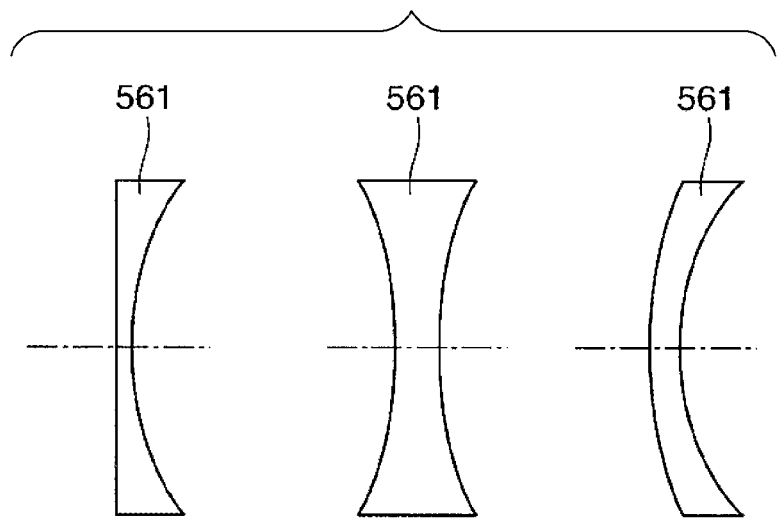
FIGS. 7A and 7B are structural views of optical elements.
Figure 7B:
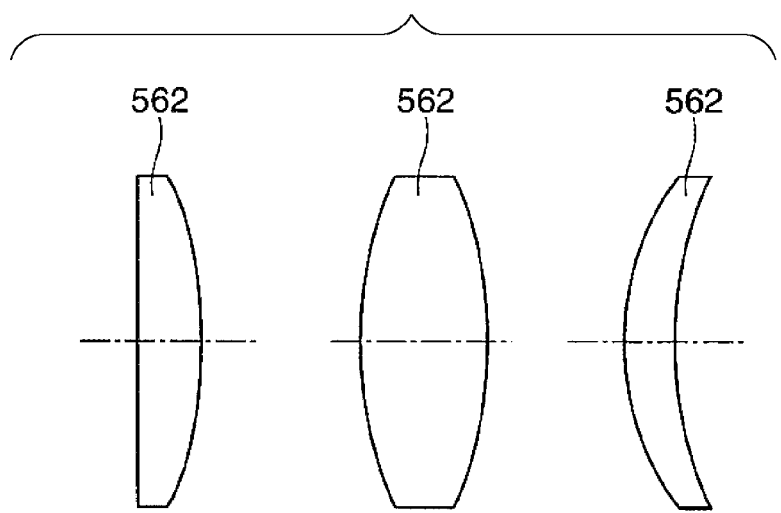

As illustrated in FIGS. 5 and 6, for example, the optical element group 56 may include a half mirror 563 disposed on the front side of the cylindrical concave lens 561 in the optical axis direction to separate a part of the light beam for adjustment of the light amount, and a cylindrical convex lens 564 disposed on the rear side of the cylindrical convex lens 562 in the optical axis direction and serving as an example of a fourth optical element composed of a convex lens, in addition to the cylindrical concave lens 561 and the cylindrical convex lens 562. The cylindrical concave lens 561 may be constituted by any of a plano-concave lens, a biconcave lens, and a meniscus lens, as illustrated in FIG. 7A. Similarly, the cylindrical convex lens 562 may be constituted by any of a plano-convex lens, a biconvex lens, and a meniscus lens, as illustrated in FIG. 7B.

Figure 8:
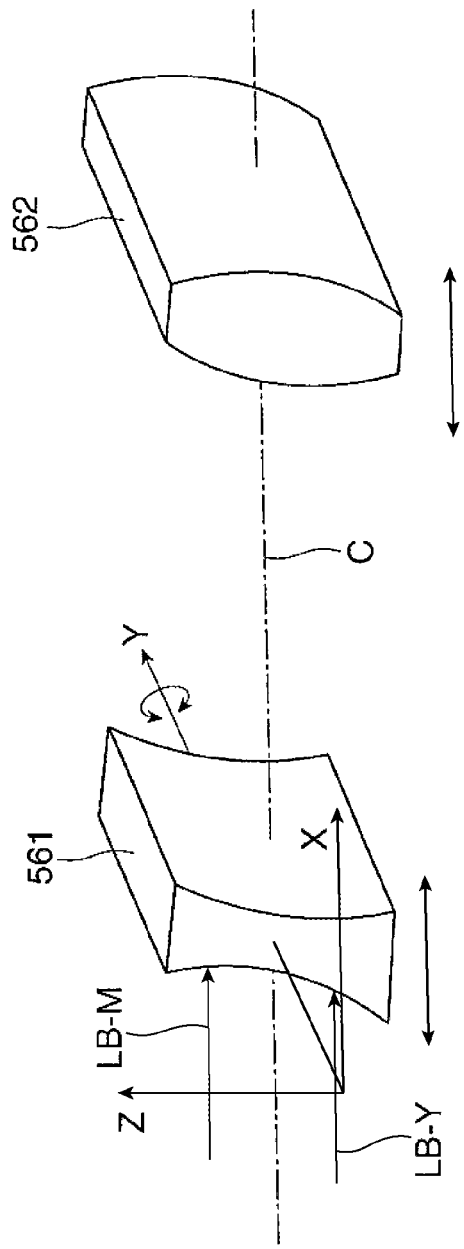
FIG. 8 is a structural perspective view of an optical element group.

In the first exemplary embodiment, the optical element group 56 is constituted by the cylindrical concave lens 561 constituted by a biconcave lens and serving as an example of the first optical element and the cylindrical convex lens 562 constituted by a biconvex lens and serving as an example of the second optical element. As illustrated in FIG. 8, the cylindrical concave lens 561 has a negative refractive power only in the sub-scanning direction (Z-direction) and is uniform in the scanning direction (Y-direction). The cylindrical convex lens 562 has a positive refractive power only in the sub-scanning direction, and is uniform in the scanning direction.

As illustrated in FIG. 6, the yellow and magenta light sources $50_Y$ and $50_M$ are arranged so that the plural yellow laser beams LB-$Y_1$ to LB-$Y_{32}$ and the plural magenta laser beams LB-$M_1$ to LB-$M_{32}$ are located on opposite sides of the optical axis C of the pre-deflection optical system 52 in the sub-scanning direction. More specifically, the plural yellow laser beams LB-$Y_1$ to LB-$Y_{32}$ are indent on a position shifted by a required distance from the optical axis C of the pre-deflection optical system 52 to one side (lower side in FIG. 6) in the sub-scanning direction. In contrast, the plural magenta laser beams LB-$M_1$ to LB-$M_{32}$ are incident on a position shifted by a required distance from the optical axis C of the pre-deflection optical system 52 to the other side (upper side in FIG. 6) in the sub-scanning direction. The plural yellow laser beams LB-$Y_1$ to LB-$Y_{32}$ and the plural magenta laser beams LB-$M_1$ to LB-$M_{32}$ are arranged at positions substantially symmetrical with respect to the optical axis C.

The coupling lenses $54_Y$ and $54_M$ are arranged so that the plural yellow laser beams LB-$Y_1$ to LB-$Y_{32}$ and the plural magenta laser beams LB-$M_1$ to LB-$M_{32}$ respectively pass through the centers of the coupling lenses $54_Y$ and $54_M$. That is, the plural yellow laser beams LB-$Y_1$ to LB-$Y_{32}$ and the plural magenta laser beams LB-$M_1$ to LB-$M_{32}$ are arranged so that the center beams thereof respectively pass through the centers of the coupling lenses $54_Y$ and $54_M$.

In the first exemplary embodiment, for example, the cylindrical concave lens 561 and the cylindrical convex lens 562 are formed of synthetic resin such as acrylic resin or polycarbonate resin. When the cylindrical concave lens 561 and the cylindrical convex lens 562 are formed of synthetic resin, aspherical lenses may be more easily produced according to the required characteristics of the cylindrical concave lens 561 and the cylindrical convex lens 562 than glass lenses. However, the cylindrical concave lens 561 and the cylindrical convex lens 562 may be formed of optical glass.

Figure 9:
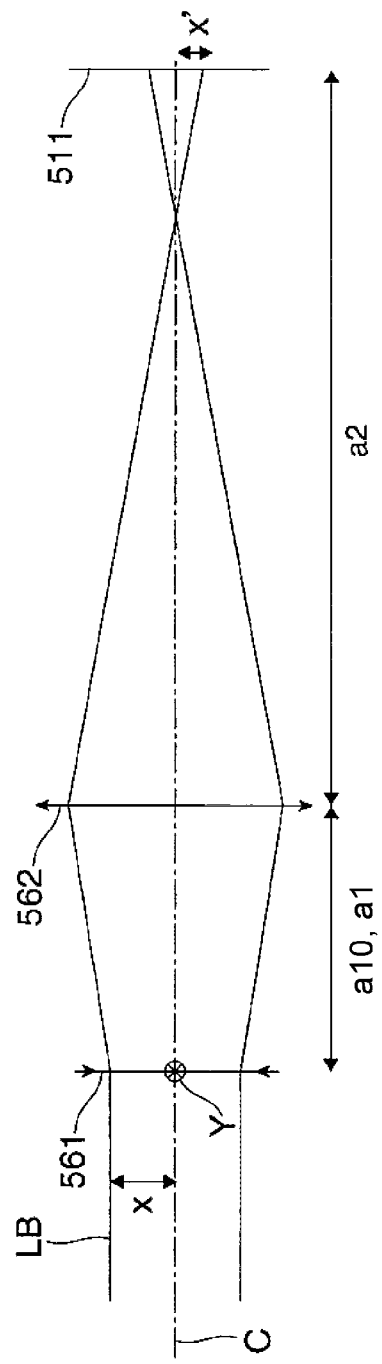
FIG. 9 is a structural view of the optical element group.

As illustrated in FIG. 9, the plural yellow and magenta laser beams LB-$Y_1$ to LB-$Y_{32}$ and LB-$M_1$ to LB-$M_{32}$ incident on the cylindrical concave lens 561 are caused by the cylindrical concave lens 561 having a negative refractive power to travel in the diverging direction. Also, the plural yellow and magenta laser beams LB-$Y_1$ to LB-$Y_{32}$ and LB-$M_1$ to LB-$M_{32}$ incident on the cylindrical convex lens 562 are caused by the cylindrical convex lens 562 having a positive refractive power to travel in the converging direction.

Figure 10:
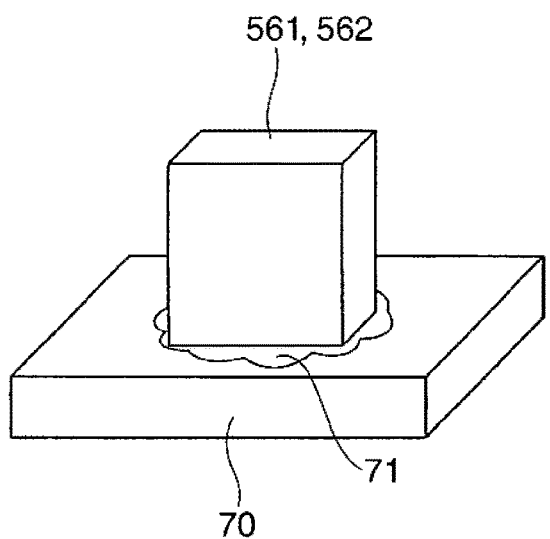
FIG. 10 is a structural view of a fixing member for the optical elements.

The position along the optical axis direction C and the turn angle around the Y-axis serving as the axis of the main scanning direction of the cylindrical concave lens 561 and the cylindrical convex lens 562 that constitute the optical element group 56 are adjusted, as illustrated in FIG. 9, and the cylindrical concave lens 561 and the cylindrical convex lens 562 are then fixedly attached to a housing 70 of the first optical scanning device $13_1$, for example, by bonding using an adhesive 71, as illustrated in FIG. 10.

Figure 11:
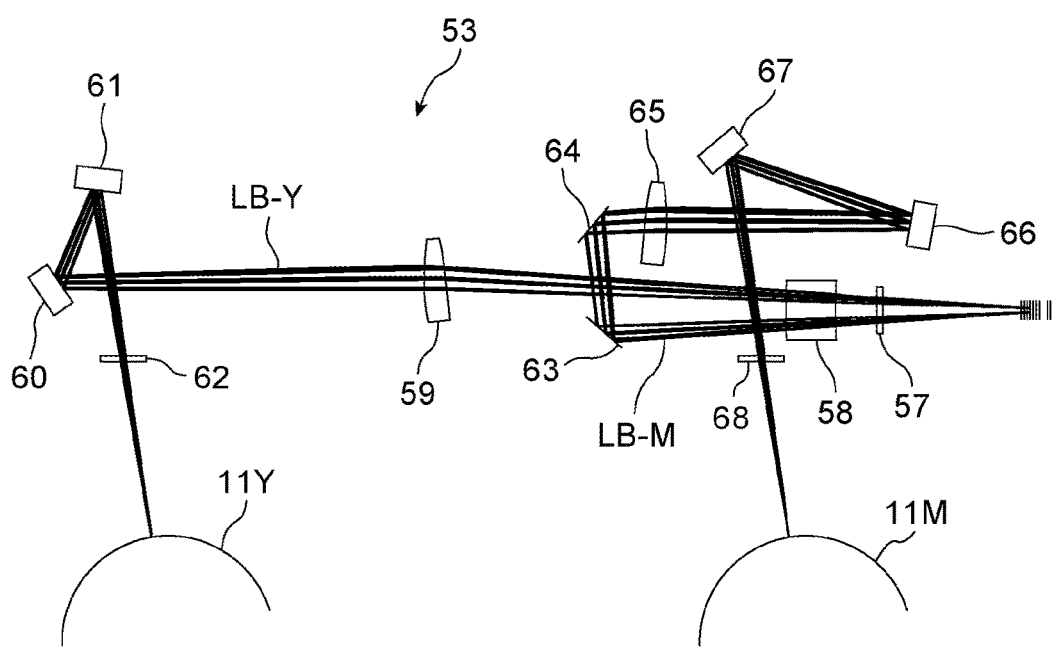
FIG. 11 is a structural side view of the optical scanning device according to the first exemplary embodiment.

As schematically illustrated in FIG. 2, the rotary polygonal mirror 51 is shaped like a relatively low (thin) regular polygonal prism (shaped like a regular hexagonal prism in FIG. 2), and the outer side surface of the rotary polygonal mirror 51 has plural (six in FIG. 2) mirror surfaces 511. The rotary polygonal mirror 51 is rotated at a predetermined rotation speed (for example, 30000 rpm) by an unillustrated driving motor. The mirror surfaces 511 of the rotary polygonal mirror 51 are disposed at such positions that the plural yellow and magenta laser beams form a line image in the sub-scanning direction. After passing through the optical element group 56 and intersecting, the plural yellow and magenta laser beams LB-$Y_1$ to LB-$Y_{32}$ and LB-$M_1$ to LB-$M_{32}$ enter positions shifted to opposite sides of the optical axis direction C on each of the mirror surfaces 511 of the rotary polygonal mirror 51. As a result, as illustrated in FIGS. 2 and 11, the plural yellow and magenta laser beams LB-$Y_1$ to LB-$Y_{32}$ and LB-$M_1$ to LB-$M_{32}$ reflected by the mirror surfaces 511 of the rotary polygonal mirror 51 enter the post-deflection optical system 53 in such a vertically separate state that the yellow laser beams LB-$Y_1$ to LB-$Y_{32}$ are located on the upper side and the magenta laser beams LB-$M_1$ to LB-$M_{32}$ are located on the lower side. The axial direction of the rotary polygonal mirror 51 coincides with the sub-scanning direction of the optical element group 56.

As illustrated in FIGS. 2 and 11, the post-deflection optical system 53 includes an incident-side dustproof glass 57 provided in the unillustrated housing of the optical scanning device 13, an fθ lens 58 common to the plural yellow and magenta laser beams LB-$Y_1$ to LB-$Y_{32}$ and LB-$M_1$ to LB-$M_{32}$, an fθ lens 59 for the yellow laser beams, mirrors 60 and 61 for the yellow laser beams, an exit-side dustproof glass 62 provided in the unillustrated housing of the optical scanning device 13, mirrors 63, 64, 66, and 67 for the magenta laser beams, an fθ lens 65 for the magenta laser beams, and an exit-side dustproof glass 68 provided in the unillustrated housing of the optical scanning device 13. For convenience, illustration of the fθ lens 58 is omitted in FIG. 2. The lenses and so on that constitute the post-deflection optical system 53 are formed of optical glass or optical resin.

As illustrated in FIG. 11, the plural yellow laser beams LB-$Y_1$ to LB-$Y_{32}$ separated to the upper side by the mirror surfaces 511 of the rotary polygonal mirror 51 are deflected and scanned in the main scanning direction (axial direction)

over the peripheral surface of the yellow photoconductor drum 11Y via the dustproof glass 57, the common fθ lens 58, the fθ lens 59 for the yellow laser beams, the mirrors 60 and 61 for the yellow laser beams, and the dustproof glass 62. Also, the plural magenta laser beams LB-M$_1$ to LB-M$_{32}$ separated to the lower side by the mirror surfaces 511 of the rotary polygonal mirror 51 are deflected and scanned in the main scanning direction (axial direction) over the peripheral surface of the magenta photoconductor drum 11M via the dustproof glass 57, the common fθ lens 58, the mirrors 63, 64, 66, and 67 for the magenta laser beams, the fθ lens 59 for the magenta laser beams, and the dustproof glass 68.

Figure 12:
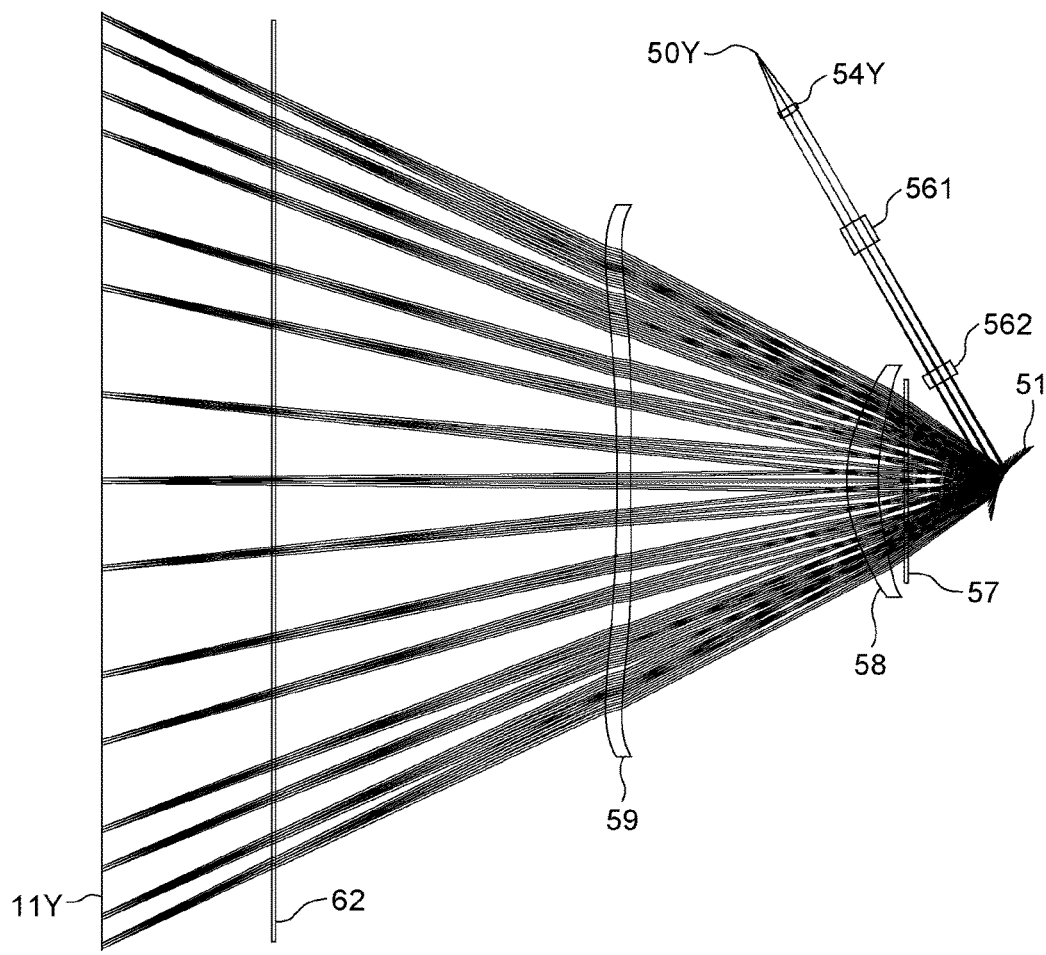
FIG. 12 is a developed view of the optical scanning device according to the first exemplary embodiment.

In the first optical scanning device 13$_1$ having the above-described structure, as illustrated in FIGS. 2, 3, and 12, the plural yellow and magenta laser beams LB-Y$_1$ to LB-Y$_{32}$ and LB-M$_1$ to LB-M$_{32}$ emitted from the yellow and magenta light sources 50$_Y$ and 50$_M$ are applied for exposure onto the surfaces of the photoconductor drums 11 along the axial direction while being deflectively scanned by the rotary polygonal mirror 51 according to the magnification determined by the pre-deflection optical system 52 and the post-deflection optical system 53. FIG. 12 is a developed view showing a state in which the optical scanning device 13 is developed along the optical axis direction of the laser beams of one of the colors. For this reason, illustration of the mirrors other than the rotary polygonal mirror 51 is omitted in FIG. 12.

At this time, in the first optical scanning device 13$_1$, the interval in the sub-scanning direction of the plural laser beams LB$_1$ to LB$_{32}$ scanned and applied for exposure on the surfaces of the photoconductor drums 11 sometimes deviates from the required value owing to, for example, errors of mounting positions of the rotary polygonal mirror 51, the pre-deflection optical system 52, and the post-deflection optical system 53 and variations of the optical components in the optical scanning device 13$_1$.

It is known that image defects called banding, such as periodic streaks and density unevenness, occur in a periodic image, such as a horizontal line image or a halftone image, formed on the photoconductor drums 11Y and 11M when the intervals in the sub-scanning direction of the plural yellow and magenta laser beams LB-Y$_1$ to LB-Y$_{32}$ and LB-M$_1$ to LB-M$_{32}$ emitted from the plural light emitting portions in the yellow and magenta light sources 50$_Y$ and 50$_M$ in the first optical scanning device 13$_1$ and focused on the photoconductor drums 11Y and 11M thus deviate from the required allowable value.

Accordingly, in the first exemplary embodiment, as illustrated in FIG. 8, the cylindrical concave lens 561 and/or the cylindrical convex lens 562 in the optical element group 56 of the pre-deflection optical system 52 is moved in parallel in the optical axis direction C as necessary, and the cylindrical concave lens 561 is turned on the Y-axis of the main scanning direction. This simultaneously adjusts the intervals in the sub-scanning direction of the plural yellow and magenta laser beams LB-Y$_1$ to LB-Y$_{32}$ and LB-M$_1$ to LB-M$_{32}$.

At the time of adjustment, the cylindrical concave lens 561 is movable in the optical axis direction C, and is also turnable on the Y-axis serving as the axis in the main scanning direction. Here, an X-direction component of eccentricity of the concave surface of the cylindrical concave lens 561 is taken as XDE (unit: mm), a Y-direction component of eccentricity of the surface is taken as YDE (unit: mm), and a Z-direction component of eccentricity of the surface is taken as ZDE (unit: mm). Further, a θx-direction component of turn of the concave surface of the cylindrical concave lens 561 is taken as ADE (turn component on X-axis; unit: degree), a θy-direction component is taken as BDE (turn component o on Y-axis; unit: degree), and a θz-direction component is taken as CDE (turn component on Z-axis; unit: degree). The Y-axis is positioned to pass through the optical axis C.

In the first exemplary embodiment, the intervals in the sub-scanning direction of the plural yellow and magenta laser beams LB-Y$_1$ to LB-Y$_{32}$ and LB-M$_1$ to LB-M$_{32}$ are simultaneously adjusted by turning the cylindrical concave lens 561 on the Y-axis of the main scanning direction. Moreover, the adjustment amounts of the intervals in the sub-scanning direction of the plural yellow and magenta laser beams LB-Y$_1$ to LB-Y$_{32}$ and LB-M$_1$ to LB-M$_{32}$ are set to be larger than when the optical element group 56 is composed of only the cylindrical convex lens 562.

Consideration will now be given to the sensitivity of the beam interval in the sub-scanning direction in a case in which the cylindrical lenses are eccentric when the plural beams enter the cylindrical lens group.

As illustrated in FIG. 9, when the optical element group 56 in the pre-deflection optical system 52 is composed of the single cylindrical concave lens 561 and the single cylindrical convex lens 562, a laser beam LB, which is incident in parallel on a position of the cylindrical concave lens 561 at a distance x from the optical axis in the sub-scanning direction intersecting the optical axis, is focused by the optical element group 56 onto a position of the mirror surface 511 of the rotary polygonal mirror 51 at a distance x' in the direction (sub-scanning direction) intersecting the optical axis.

Accordingly, when the cylindrical concave lens 561 is moved in the optical axis direction, a value showing the extent to which the distance x' is displaced according to a moving distance Δa1 of the cylindrical concave lens 561 along the optical axis direction, that is, the sensitivity serving as the displacement amount in the sub-scanning direction of the laser beam LB when the cylindrical concave lens 561 is moved in the optical axis direction is given by the following Expression 1:

$$\frac{\partial x'}{\partial a1} = -\frac{(f2-a2)\cdot x}{f1\cdot f2} \quad (1)$$

Here, f1 represents the focal length of the cylindrical concave lens 561, f2 represents the focal length of the cylindrical convex lens 562, a10 (initial value) represents the distance between the cylindrical concave lens 561 and the cylindrical convex lens 562, a1 (variable) represents the distance between the cylindrical concave lens 561 and the cylindrical convex lens 562, and a2 (variable) represents the distance between the cylindrical convex lens 562 and the mirror surface 511 of the rotary polygonal mirror 51. Also, the cylindrical concave lens 561 and the cylindrical convex lens 562 are approximated as thin lenses.

Figure 13:
FIG. 13 is a chart showing the characteristics of the optical scanning device according to the first exemplary embodiment.

FIG. 13 is a chart showing the results of calculation of the sensitivity $(=\{-(f2-a2)/(f1\times f2)\})$ of the optical element group 56 composed of the cylindrical concave lens 561 and the cylindrical convex lens 562 according to Expression 1 when the combined focal length f of the cylindrical lens unit is fixed at 50 mm and the focal length f1 of the cylindrical concave lens 561, the focal length f2 of the cylindrical convex lens 562, and the distance a10 (initial value) between the cylindrical concave lens 561 and the cylindrical convex lens 562 are variously changed.

Figure 14:
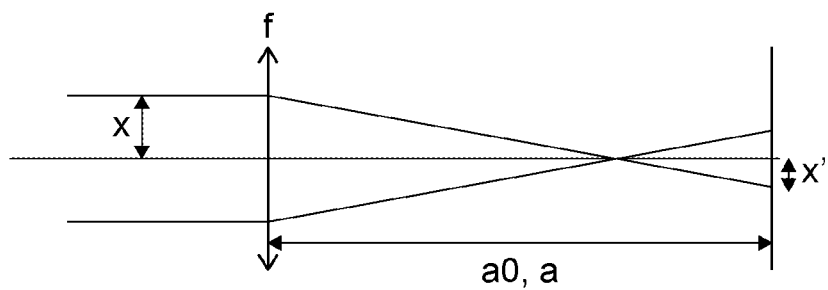
FIG. 14 is a schematic view of the light source.

As illustrated in FIG. 14, when the optical element group 56 in the pre-deflection optical system 52 is composed of only one cylindrical convex lens for comparison, a laser beam LB, which is incident on a position of the cylindrical convex lens at a distance x in the direction intersecting the optical axis, is focused on a position of the rotary polygonal mirror 51 at a distance x' in the direction intersecting the optical axis. Here, f represents the focal length of the cylindrical convex lens. The focal length f of the cylindrical convex lens is set to be equal to the combined focal length of the cylindrical concave lens 561 and the cylindrical convex lens 562.

The sensitivity showing the extent to which the distance x' changes when the cylindrical convex lens is moved along the optical axis direction is given by the following Expression 2:

$$\frac{\partial x'}{\partial a1} = -\frac{x}{f} \quad (2)$$

When the focal length f of the cylindrical convex lens 562 is 50 mm and the initial value a0 of the distance is 50 mm, the sensitivity is $-1/f = -1/50 = -0.02$.

Therefore, when the optical element group 56 is composed of plural lenses, that is, the cylindrical concave lens 561 and the cylindrical convex lens 562 and the cylindrical concave lens 561 is moved along the optical axis direction, the position x' where the laser beam LB is focused along the direction intersecting the optical axis direction may be adjusted according to the sensitivity shown in FIG. 13.

More specifically, as illustrated in FIG. 9, in the optical element group 56, the cylindrical convex lens 562 is disposed so that the distance a2 on the front side of the mirror surface 511 of the rotary polygonal mirror 51 along the optical axis direction is a predetermined first value and so that the distance a1 between the cylindrical concave lens 561 and the cylindrical convex lens 562 is a predetermined second value.

FIG. 13 shows that the sensitivity is -0.05556 in the first exemplary embodiment, for example, when the cylindrical concave lens 561 having a focal length of 30 mm and the cylindrical convex lens 562 having a focal length of 50 mm are combined, when the cylindrical concave lens 561 having a focal length of 30 mm and the cylindrical convex lens 562 having a focal length of 40 mm are combined, when the cylindrical concave lens 561 having a focal length of 30 mm and the cylindrical convex lens 562 having a focal length of 50 mm are combined, and when the cylindrical convex lens 562 having a focal length of 30 mm and the cylindrical concave lens 561 having a focal length of 50 mm are combined, and that this sensitivity is much higher than the sensitivity of -0.02 when the optical element group 56 is composed of only the cylindrical convex lens 562.

Therefore, to obtain a certain degree of sensitivity, when the optical element group 56 in the pre-deflection optical system 52 is composed of plural lenses, it is preferable to use a lens having a negative refractive power. At this time, the plural lenses may be either a combination of a lens having a negative refractive power and a lens having a positive refractive power or a combination of a lens having a positive refractive power and a lens having a negative refractive power.

As illustrated in FIG. 8, to turn (tilt) the cylindrical concave lens 561, which constitutes the optical element group 56, in the clockwise direction on the Y-axis along the main scanning direction may be approximated as a state in which the cylindrical concave lens 561 is moved rearward (toward the rotary polygonal mirror) along the optical axis direction C relative to the plural magenta laser beams $LB-M_1$ to $LB-M_{32}$ incident on the upper side of the optical axis C, and may be approximated as a state in which the cylindrical concave lens 561 is moved forward (toward the light source) along the optical axis direction C relative to the plural yellow laser beams $LB-Y_1$ to $LB-Y_{32}$ incident on the lower side of the optical axis C. At this time, when the cylindrical concave lens 561 is turned in the clockwise direction on the Y-axis along the main scanning direction, the intervals in the sub-scanning direction of the plural yellow and magenta laser beams $LB-Y_1$ to $LB-Y_{32}$ and $LB-M_1$ to $LB-M_{32}$ are adjusted in opposite directions.

Figure 15A:
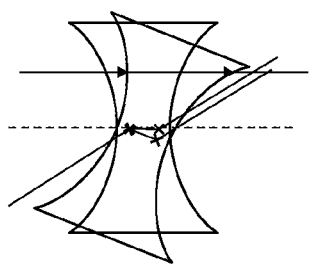
FIGS. 15A and 15B are schematic views illustrating states in which the optical elements are turned.
Figure 15B:
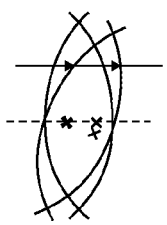
Figure 16A:
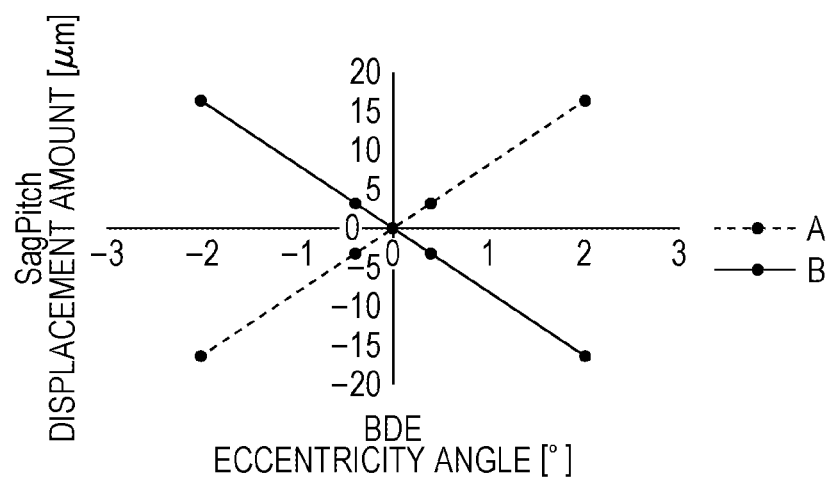
FIGS. 16A and 16B are graphs showing the differences in characteristics when a cylindrical concave lens and a cylindrical convex lens are turned.
Figure 16B:
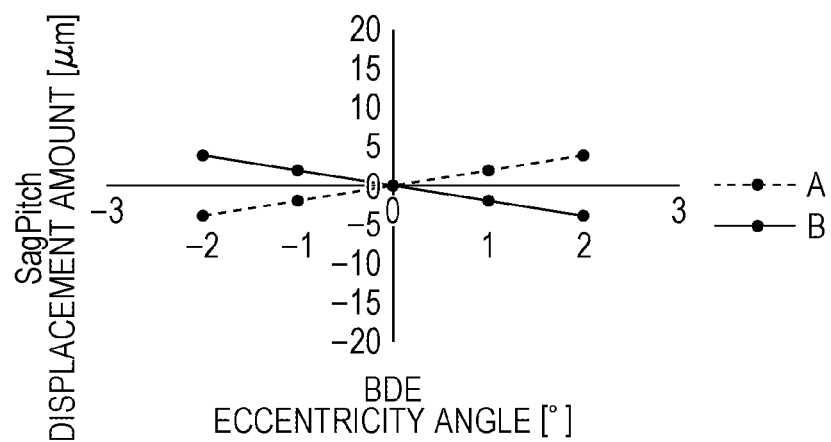

Further, the interval in the sub-scanning direction of the laser beams LB adjusted by turning the cylindrical concave lens 561 on the Y-axis along the main scanning direction may be set to be much larger than when only the cylindrical convex lens 562 is turned, as illustrated in FIGS. 15A, 15B, 16A, and 16B. FIG. 15A shows a case in which the cylindrical concave lens 561 is turned in the optical element group 56 composed of the cylindrical concave lens 561 and the cylindrical convex lens 562, and FIG. 15B shows a case in which the cylindrical convex lens is turned in the optical element group composed of only the cylindrical convex lens.

When the cylindrical concave lens 561 is turned on the Y-axis along the main scanning direction, as illustrated in FIG. 15A, the incident position of the laser beam LB on the cylindrical concave lens 561 changes, and as a result, the incident position of the laser beam LB on the mirror surface 511 of the rotary polygonal mirror 51 also changes along the sub-scanning direction.

Figure 17:
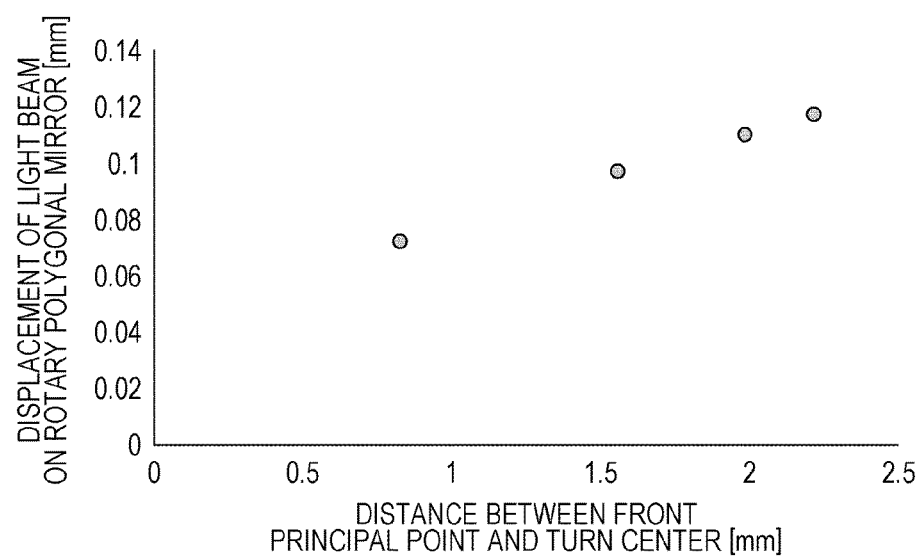
FIG. 17 is a graph showing the relationship between the distance between a front principal point and a turn center of the cylindrical concave lens and the beam displacement on a rotary polygonal mirror.

FIG. 17 is a graph showing how the incident position of the laser beam LB incident on the mirror surface 511 of the rotary polygonal mirror 51 changes when the distance between the Y-axis on which the cylindrical concave lens 561 is turned and the front principal point of the cylindrical concave lens 561 is changed.

As is clear from FIG. 17, as the distance between the Y-axis on which the cylindrical concave lens 561 is turned and the front principal point of the cylindrical concave lens 561 decreases, the displacement of the incident position of the laser beam LB incident on the mirror surface 511 of the rotary polygonal mirror 51 decreases. Hence, the displacement of the incident position on the optical system on the rear side of the rotary polygonal mirror is also mall, and the influence on the performance other than the interval in the sub-scanning direction is small.

Accordingly, in the first exemplary embodiment, the Y-axis on which the cylindrical concave lens 561 is turned is set near (at the position close to) the front principal point of the cylindrical concave lens 561.

[Operation of Optical Scanning Devices]

In the first and second optical scanning devices $13_1$ and $13_2$ according to the first exemplary embodiment, the intervals in the sub-scanning direction of the plural laser beams $LB-Y_1$ to $LB-Y_{32}$ and $LB-M_1$ to $LB-M_{32}$ are adjusted as follows, for example, when the first and second optical scanning devices $13_1$ and $13_2$ are assembled or when the image forming apparatus 1 is shipped. While the adjusting operation in the first optical scanning device $13_1$ will now be described, this also applies to the second optical scanning device $13_2$.

In the first optical scanning device $13_1$, as illustrated in FIG. 2, unillustrated light receiving sensors, such as charge coupled devices, for receiving the plural laser beams LB-$Y_1$ to LB-$Y_{32}$ and LB-$M_1$ to LB-$M_{32}$ are disposed on the surfaces of the photoconductor drums 11Y and 11M or at positions corresponding to the surfaces of the photoconductor drums 11Y and 11M. The used light receiving sensors have a resolution higher than the intervals in the sub-scanning direction of the plural laser beams LB-$Y_1$ to LB-$Y_{32}$ and LB-$M_1$ to LB-$M_{32}$.

Next, the yellow and magenta light sources $131_Y$ and $131_M$ are simultaneously caused to emit light, and the intervals in the sub-scanning direction of the plural laser beams LB-$Y_1$ to LB-$Y_{32}$ and LB-$M_1$ to LB-$M_{32}$ applied for exposure onto the surfaces of the photoconductor drums 11Y and 11M via the rotary polygonal mirror 51, the pre-deflection optical system 52, and the post-deflection optical system 53 are detected by the light receiving sensors disposed, for example, at the positions corresponding to the surfaces of the photoconductor drums 11Y and 11M, instead of the positions of the photoconductor drums 11Y and 11M. Detection may be performed in a state in which the rotary polygonal mirror 51 is rotating.

When the intervals in the sub-scanning direction of the plural laser beams LB-$Y_1$ to LB-$Y_{32}$ and LB-$M_1$ to LB-$M_{32}$ detected by the light receiving sensors are within the range of required tolerance (allowable value), the adjusting operation is finished.

Figure 18B:
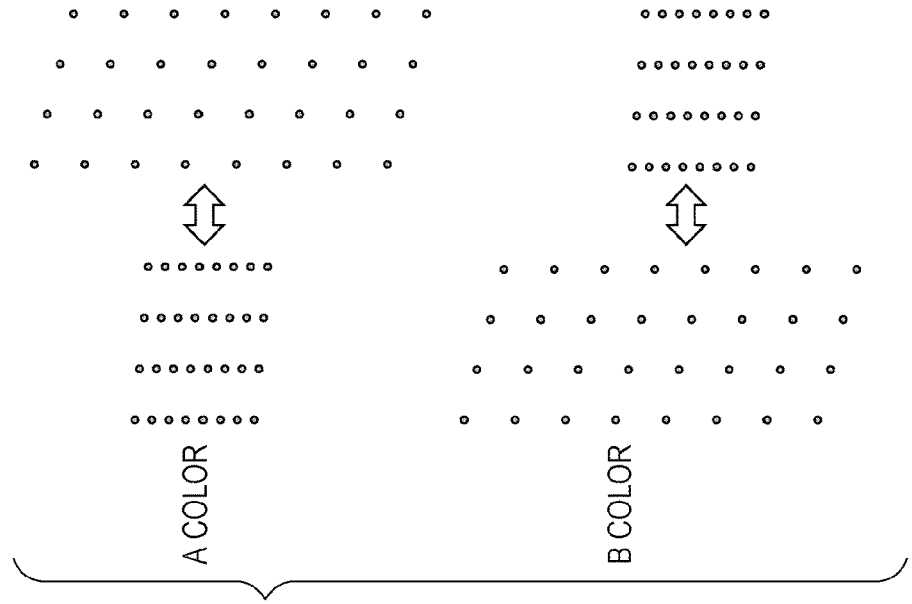
FIGS. 18A and 18B are explanatory views showing the operation of the optical scanning device according to the first exemplary embodiment.
Figure 18A:
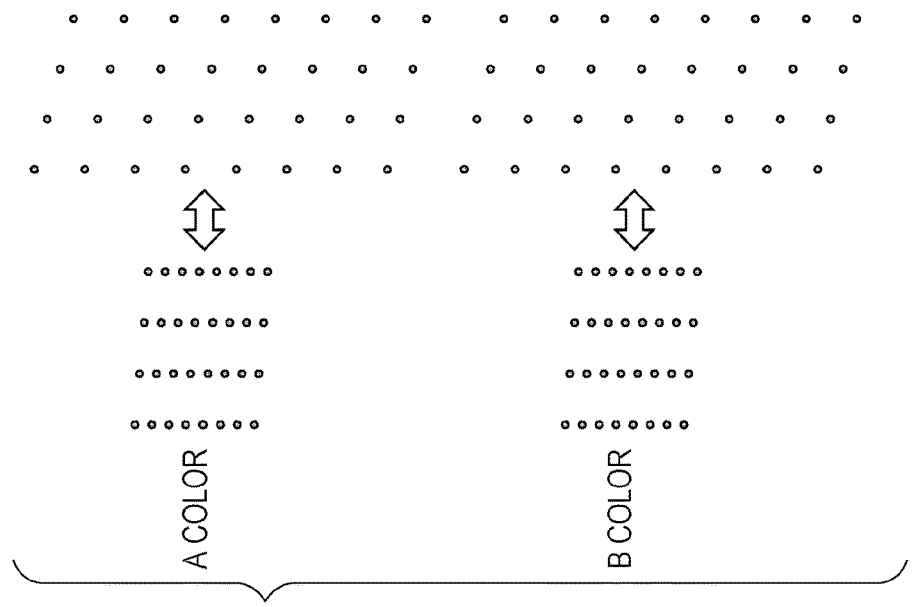

Next, when the intervals in the sub-scanning directions of the plural laser beams LB-$Y_1$ to LB-$Y_{32}$ and LB-$M_1$ to LB-$M_{32}$ in the yellow and magenta light sources $131_Y$ and $131_M$ are shorter (narrower) by the same amount than the common target value of the yellow and magenta light sources $131_Y$ and $131_M$, as illustrated in FIG. 18A, the cylindrical concave lens 561 is moved along the optical axis direction C to increase the intervals in the sub-scanning directions of the plural laser beams LB-$Y_1$ to LB-$Y_{32}$ and LB-$M_1$ to LB-$M_{32}$ in the yellow and magenta light sources $131_Y$ and $131_M$ so that the intervals are adjusted within the predetermined range.

More specifically, when the cylindrical concave lens 561 is moved along the optical axis direction C in the direction to move away from the rotary polygonal mirror 51, the intervals in the sub-scanning directions of the plural laser beams LB-$Y_1$ to LB-$Y_{32}$ and LB-$M_1$ to LB-$M_{32}$ in the yellow and magenta light sources $131_Y$ and $131_M$ change to increase. When the cylindrical concave lens 561 is moved along the optical axis direction C in the direction to approach the rotary polygonal mirror 51, the intervals in the sub-scanning directions of the plural laser beams LB-$Y_1$ to LB-$Y_{32}$ and LB-$M_1$ to LB-$M_{32}$ in the yellow and magenta light sources $131_Y$ and $131_M$ change to decrease. For this reason, the intervals in the sub-scanning directions of both the plural laser beams LB-$Y_1$ to LB-$Y_{32}$ and LB-$M_1$ to LB-$M_{32}$ in the yellow and magenta light sources $131_Y$ and $131_M$ are adjusted to fall within the predetermined range while being measured with the light receiving sensors.

When the interval in the sub-scanning direction of the plural laser beams LB-$Y_1$ to LB-$Y_{32}$ in the yellow light source $131_Y$, of the intervals in the sub-scanning direction of the plural laser beams LB-$Y_1$ to LB-$Y_{32}$ and LB-$M_1$ to LB-$M_{32}$ in the yellow and magenta light sources $131_Y$ and $131_M$, is smaller (narrower) than the target value, the interval in the sub-scanning direction of the plural laser beams LB-$M_1$ to LB-$M_{32}$ in the magenta light source $131_M$ is larger (wider) than the target value, and the deviation amounts of both the laser beams LB-$Y_1$ to LB-$Y_{32}$ and the laser beams LB-$M_1$ to LB-$M_{32}$ from the target value are nearly equal (including a case where the deviation amounts are equal), the cylindrical concave lens 561 is turned on the Y-axis in the clockwise direction to adjust the intervals in the sub-scanning direction of the plural laser beams LB-$Y_1$ to LB-$Y_{32}$ and LB-$M_1$ to LB-$M_{32}$ so that the intervals fall within the predetermined range.

More specifically, when the cylindrical concave lens 561 is turned on the Y-axis in the clockwise direction, the interval in the sub-scanning direction of the yellow laser beams LB-$Y_1$ to LB-$Y_{32}$ changes to increase, and the interval in the sub-scanning direction of the magenta laser beams LB-$M_1$ to LB-$M_{32}$ changes to decrease. For this reason, the intervals of both the yellow and magenta laser beams LB-$Y_1$ to LB-$Y_{32}$ and LB-$M_1$ to LB-$M_{32}$ are adjusted to fall within the predetermined range while being measured with the light receiving sensors.

Further, when the interval in the sub-scanning direction of the yellow laser beams LB-$Y_1$ to LB-$Y_{32}$, of the intervals in the sub-scanning direction of the yellow and magenta laser beams LB-$Y_1$ to LB-$Y_{32}$ and LB-$M_1$ to LB-$M_{32}$, is wider (larger) than the target value, the interval in the sub-scanning direction of the magenta laser beams LB-$M_1$ to LB-$M_{32}$ is narrower (smaller) than the target value, and the deviation amounts of both the laser beams LB-$Y_1$ to LB-$Y_{32}$ and the laser beams LB-$M_1$ to LB-$M_{32}$ from the target value are nearly equal (including a case where the deviation amounts are equal), conversely to the above, the cylindrical concave lens 561 is turned on the Y-axis in the counterclockwise direction, whereby the intervals in the sub-scanning direction of the yellow and magenta laser beams LB-$Y_1$ to LB-$Y_{32}$ and LB-$M_1$ to LB-$M_{32}$ are adjusted to fall within the predetermined range.

When one of the intervals in the sub-scanning direction of the yellow and magenta laser beams LB-$Y_1$ to LB-$Y_{32}$ and LB-$M_1$ to LB-$M_{32}$, for example, the interval in the sub-scanning direction of the yellow laser beams LB-$Y_1$ to LB-$Y_{32}$ is within the predetermined range and the other interval, for example, the interval in the sub-scanning direction of the magenta laser beams LB-$M_1$ to LB-$M_{32}$ is narrower (smaller) than the target value, the cylindrical concave lens 561 is moved along the optical axis direction C in the direction to change the interval in the sub-scanning direction of the yellow laser beams LB-$Y_1$ to LB-$Y_{32}$ to be wider than the predetermined range, to change the interval in the sub-scanning direction of the magenta laser beams LB-$M_1$ to LB-$M_{32}$ to be narrower than the target value while decreasing the deviation from the initial state, and to adjust the deviations of the intervals in the sub-scanning direction of the yellow and magenta laser beams to be nearly equal. After that, the cylindrical concave lens 561 is turned on the Y-axis to adjust the intervals in the sub-scanning direction of the yellow and magenta laser beams so that the intervals fall within the predetermined range.

Figure 19:
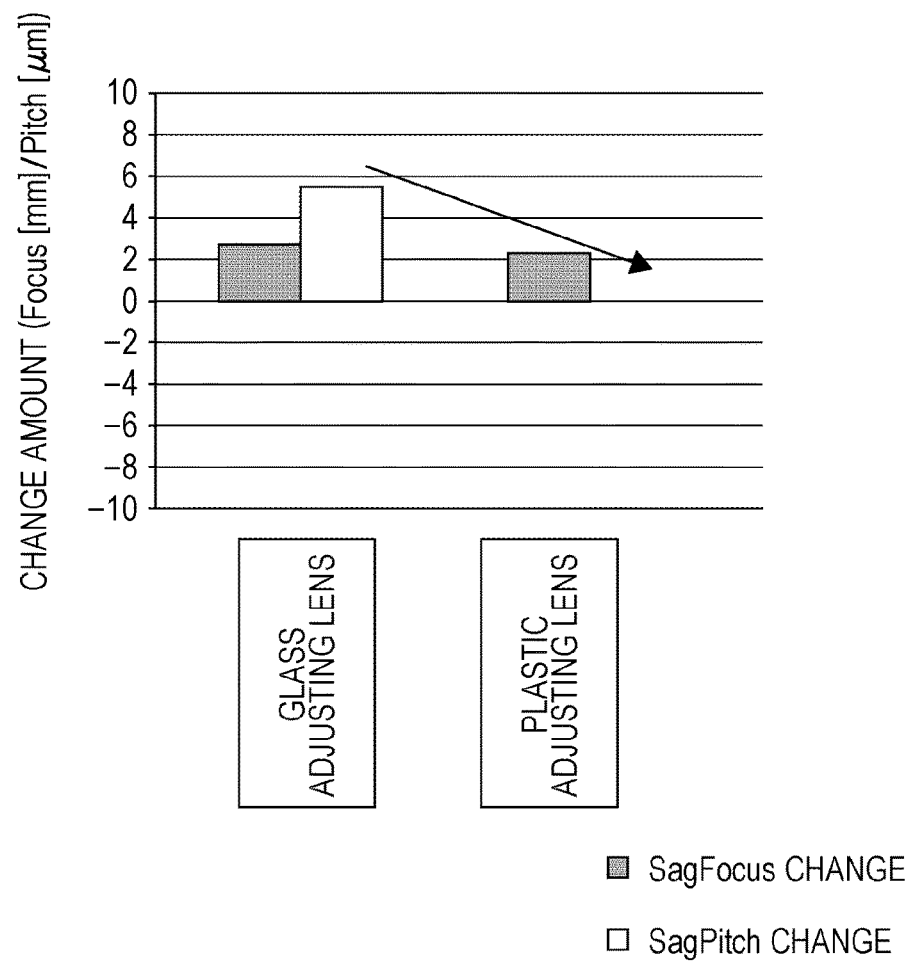
FIG. 19 shows the comparison of the sensitivity of SagPitch/SagFocus to the temperature.

In the first exemplary embodiment, as shown in FIG. 19, the cylindrical concave lens 561 is formed of optical resin. For example, when the lens having a positive power in the sub-scanning direction in the post-deflection optical system 53 is formed of optical resin and the temperature of the optical scanning device 13 rises, the temperature characteristics of the cylindrical concave lens 561 formed of optical resin and the temperature characteristics of the post-deflection optical system 53 using optical resin are cancelled each other.

Second Exemplary Embodiment

Figure 20:
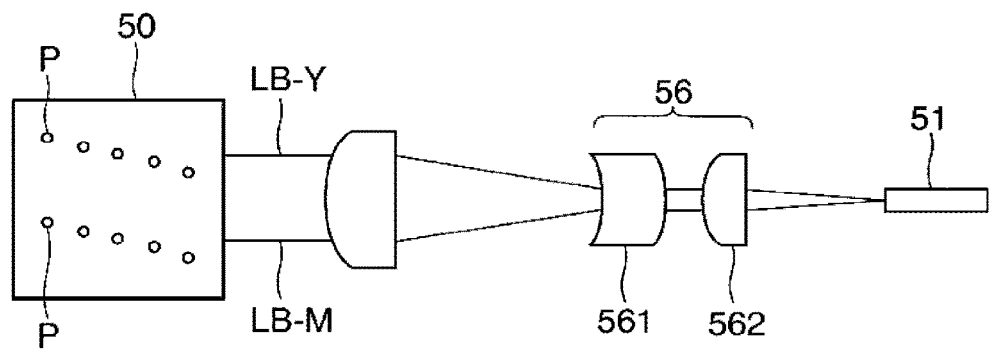
FIG. 20 is a structural plan view of an optical scanning device according to a second exemplary embodiment of the present invention.

FIG. 20 illustrates an optical scanning device according to a second exemplary embodiment.

As illustrated in FIG. 20, an optical scanning device 13 according to the second exemplary embodiment is configurated in such a manner that a single light source 50 including plural light emitting portions P two-dimensionally arranged at different positions in the main scanning direction and the sub-scanning direction is used as a light source for two color laser beams LB.

Third Exemplary Embodiment

Figure 21:
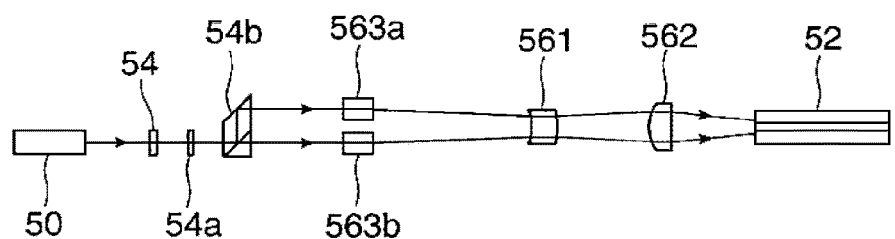
FIG. 21 is a structural plan view of an optical scanning device according to a third exemplary embodiment of the present invention.

FIG. 21 illustrates an optical scanning device according to a third exemplary embodiment.

As illustrated in FIG. 21, in an optical scanning device 13 of the third exemplary embodiment, for example, plural laser beams emitted from the same light source 50 in a time division manner are deflectively scanned by the same rotary polygonal mirror.

In FIG. 21, reference numerals 54a, 54b, and 563a and 563b denote an aperture plate, a beam splitting lens, and cylindrical lenses, respectively.

While the image forming apparatuses of the above-described exemplary embodiments are full-color image forming apparatuses each of which forms four color toner images of yellow (Y), magenta (M), cyan (C), and black (K), the present invention may be similarly applied to a monochromatic image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical scanning device comprising:
a light source having a plurality of light emitting portions;
a deflection unit that deflects and scans a plurality of light beams emitted from the light source in a main scanning direction; and
a plurality of optical element groups disposed between the light source and the deflection unit and including an optical element having a negative refractive power along a sub-scanning direction intersecting the main scanning direction,
wherein an interval in the sub-scanning direction of the plurality of light beams is adjusted by tilting the optical element having the negative refractive power about an axis along the main scanning direction.

2. The optical scanning device according to claim 1, wherein the plurality of optical element groups include at least a cylindrical concave lens and a cylindrical convex lens, and
wherein the intervals in the sub-scanning direction of the plurality of light beams are adjusted by moving the cylindrical concave lens along an optical axis direction and tilting the cylindrical concave lens about a center axis along the main scanning direction.

3. The optical scanning device according to claim 2, wherein the center axis about which the cylindrical concave lens is tilted is disposed near a front principal point of the cylindrical concave lens.

4. An image forming apparatus comprising:
an image carrier that carries an electrostatic latent image; and
an optical scanning device that forms the electrostatic latent image by scanning and exposing a surface of the image carrier according to an image,
wherein the optical scanning device is the optical scanning device according to claim 1.

5. An optical scanning device comprising:
a first light source having a plurality of light emitting portions;
a second light source having a plurality of light emitting portions;
a deflection unit that deflects and scans a plurality of first light beams and a plurality of second light beams respectively emitted from the first and second light sources in a main scanning direction; and
a common optical element group disposed between the first and second light sources and the deflection unit to simultaneously adjust intervals in a sub-scanning direction of the plurality of first light beams and the plurality of second light beams,
wherein the optical element group includes at least a cylindrical concave lens and a cylindrical convex lens, and
wherein the intervals in the sub-scanning direction of the plurality of first light beams and the plurality of second light beams are adjusted by moving the cylindrical concave lens along an optical axis direction and tilting the cylindrical concave lens about a center axis along the main scanning direction.

6. The optical scanning device according to claim 5, wherein the plurality of first light beams and the plurality of second light beams emitted from the first and second light sources are respectively incident on positions in the common optical element group that are symmetrical in the sub-scanning direction with respect to an optical axis.

7. The optical scanning device according to claim 6, wherein the optical element group includes at least a cylindrical concave lens and a cylindrical convex lens, and
wherein the intervals in the sub-scanning direction of the plurality of first light beams and the plurality of second light beams are adjusted by moving the cylindrical concave lens along an optical axis direction and tilting the cylindrical concave lens about a center axis along the main scanning direction.

8. The optical scanning device according to claim 7, wherein the center axis about which the cylindrical concave lens is tilted is disposed near a front principal point of the cylindrical concave lens.

9. The optical scanning device according to claim 5, wherein the center axis on about which the cylindrical concave lens is tilted is disposed near a front principal point of the cylindrical concave lens.

* * * * *